United States Patent
Ozaki (10) Patent No.: US 10,100,904 B2
(45) Date of Patent: Oct. 16, 2018

(54) DUAL CLUTCH TRANSMISSION

(71) Applicant: ISUZU MOTORS LIMITED, Tokyo (JP)

(72) Inventor: Sho Ozaki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 60 days.

(21) Appl. No.: 15/508,888

(22) PCT Filed: Sep. 3, 2015

(86) PCT No.: PCT/JP2015/075053
§ 371 (c)(1),
(2) Date: Mar. 3, 2017

(87) PCT Pub. No.: WO2016/035848
PCT Pub. Date: Mar. 10, 2016

(65) Prior Publication Data
US 2017/0198787 A1  Jul. 13, 2017

(30) Foreign Application Priority Data

Sep. 3, 2014  (JP) .................................. 2014-178719

(51) Int. Cl.
*F16H 3/091* (2006.01)
*F16H 3/00* (2006.01)
(Continued)

(52) U.S. Cl.
CPC ............. *F16H 3/006* (2013.01); *F16H 3/091* (2013.01); *F16H 3/097* (2013.01); *F16H 3/0915* (2013.01);
(Continued)

(58) Field of Classification Search
CPC .............................. F16H 3/006; F16H 3/0915
See application file for complete search history.

(56) References Cited

U.S. PATENT DOCUMENTS

| 5,383,375 A | 1/1995 | Ogawa et al. |
| 7,472,617 B2 * | 1/2009 | Nicklass .............. F16H 3/006 74/331 |

(Continued)

FOREIGN PATENT DOCUMENTS

| DE | 10037398 A1 | 2/2002 |
| DE | 102009014357 A1 | 9/2010 |

(Continued)

OTHER PUBLICATIONS

International Search Report and Written Opinion for PCT App No. PCT/JP2015/075053 dated Nov. 24, 2015, 10 pgs.

(Continued)

*Primary Examiner* — Sherry L Estremsky
(74) *Attorney, Agent, or Firm* — Procopio, Cory, Hargreaves & Savitch LLP (57) ABSTRACT

A dual clutch transmission 1 is provided with a first clutch 2, a second clutch 3, a first input shaft 4, a second input shaft 5, a counter shaft 6, an output shaft 7, a first splitter gear-shifting unit 10, a second gear-shifting transmission unit 20, and an output unit 30. The first splitter gear-shifting unit 10 has a first input gear 11a, a first counter gear 11b, a second counter gear 12a, an input/output gear 12b, a first linking mechanism 13, a second linking mechanism 14, and a third linking mechanism 15. The second splitter gear-shifting unit 20 has a second input gear 21a, a third counter gear 21b, a third input gear 22a, a fourth counter gear 22b, and a fourth linking mechanism. The output unit 30 has a fifth counter gear 31a, a forward output gear 31b, and a fifth linking mechanism 33.

1 Claim, 6 Drawing Sheets

(51) Int. Cl.
   *F16H 37/04*    (2006.01)
   *F16H 37/08*    (2006.01)
   *F16H 3/097*    (2006.01)

(52) U.S. Cl.
   CPC ....... *F16H 37/046* (2013.01); *F16H 37/0833* (2013.01)

(56) References Cited

U.S. PATENT DOCUMENTS

| | | | |
|---|---|---|---|
| 7,914,412 B2 * | 3/2011 | Gitt | F16H 37/042 475/207 |
| 8,001,863 B2 * | 8/2011 | Patzner | F16H 3/006 74/329 |
| 9,546,721 B2 * | 1/2017 | Mittelberger | F16H 37/042 |
| 9,989,134 B2 * | 6/2018 | Ozaki | F16H 37/065 |
| 2002/0033059 A1 | 3/2002 | Pels et al. | |
| 2010/0162840 A1 | 7/2010 | Gitt | |
| 2011/0030488 A1 * | 2/2011 | Gumpoltsberger | F16H 3/006 74/331 |
| 2014/0165755 A1 | 6/2014 | Morris et al. | |
| 2015/0267810 A1 * | 9/2015 | Kaltenbach | F16H 37/046 475/209 |
| 2016/0327125 A1 | 11/2016 | Morris et al. | |
| 2017/0261081 A1 * | 9/2017 | Ozaki | F16H 3/091 |

FOREIGN PATENT DOCUMENTS

| | | | | |
|---|---|---|---|---|
| DE | 102012203058 A1 * | 8/2013 | | F16H 3/006 |
| DE | 10-2013-113908 A1 | 6/2014 | | |
| EP | 1004795 A1 | 5/2002 | | |
| JP | 2002-089594 A | 3/2002 | | |
| JP | 2010-531417 A | 9/2010 | | |
| WO | WO-2015093474 A1 * | 6/2015 | | F16H 3/006 |

OTHER PUBLICATIONS

Extended European Search Report for EP App No. 15838527.2 dated Apr. 17, 2018, 8 pgs.

* cited by examiner

DUAL CLUTCH TRANSMISSION

CROSS-REFERENCE TO RELATED APPLICATIONS

This application is a U.S. National Stage entry of PCT Application No. PCT/JP2015/075053, filed on Sep. 3, 2015, which claims priority to Japanese Patent Application No. 2014-178719, filed Sep. 3, 2014, the contents of which are incorporated herein by reference.

TECHNICAL FIELD

The present invention relates to a dual clutch transmission configured to be mounted on a vehicle.

BACKGROUND ART

There have been known dual clutch transmissions having two clutches (for example, refer to PTL 1). A dual clutch transmission, which is a power transmission mechanism, has two systems of odd-numbered gears and even-numbered gears which correspond individually to two clutches thereof and changes the gears by engaging the two systems in an alternate fashion. With such a dual clutch transmission, since while one system is engaged, the other system is waiting, a gear change requires a short period of time.

CITATION LIST

Patent Literature

PTL 1: JP-T-2010-531417

SUMMARY OF INVENTION

Technical Problem

However, in order to increase the number of gears to be changed in such a related-art structure, the number of gears needs to be increased, which calls for the increase in overall size, weight and cost of a transmission to be produced.

Then, an object of the invention is to provide a dual clutch transmission in which the number of gears to be changed is increased while suppressing the increase in size, weight and cost thereof.

Solution to Problem

With a view to achieving the object, according to the invention, there is provided a dual clutch transmission mounted on a vehicle which includes a first clutch, a second clutch, a first input shaft, a second input shaft, a counter shaft, an output shaft, a first splitter gear changing portion, a second splitter gear changing portion, and an output portion.

The second clutch is disposed concentrically with the first clutch. The first input shaft is connected to a power source via the first clutch. The second input shaft is a hollow shaft through which the first input shaft is inserted rotatably and is connected to the power source via the second clutch. The counter shaft is disposed parallel to the first input shaft and the second input shaft. The output shaft is disposed parallel to the counter shaft and coaxial with the first input shaft and the second input shaft.

The first splitter gear changing portion has a first input gear through which the first input shaft is inserted rotatably, a first counter gear which is fixed to the counter shaft and which meshes with the first input gear, a second counter gear through which the counter shaft is inserted rotatably, an input/output gear through which the output gear is inserted rotatably and which meshes with the second counter gear, a first coupling mechanism configured to couple the first input gear and the input/output gear selectively to the first input shaft, a second coupling mechanism configured to couple the second counter gear to the counter shaft, and a third coupling mechanism configured to couple the input/output gear to the output shaft.

The splitter gear changing portion has a second input gear through which the second input shaft is inserted rotatably, a third counter gear which is fixed to the counter shaft and which meshes with the second input gear, a third input gear through which the first input shaft is inserted rotatably, a fourth counter gear which is fixed to the counter shaft and which meshes with the third input gear, and a fourth coupling mechanism configured to couple the second input gear and the third input gear selectively to the second input shaft.

The output portion has a fifth counter gear which is fixed to the counter shaft, an output gear through which the output shaft is inserted rotatably and which meshes with the fifth counter gear, and a fifth coupling mechanism configured to couple the output gear to the output shaft.

In the configuration described above, the first input gear, the input/output gear, the second input gear and the third input gear are connected alternately to the first input shaft or the second input shaft in such a way as to replace the gear which is then connected to the first input shaft or the second input shaft, and the output gear is coupled to the output shaft as required. By doing so, four speed gears to be changed are realized on a low speed side.

In addition, the first input gear, the second input gear and the third input gear are connected alternately to the first input shaft or the second input shaft in such a way as to replace the gear which is then connected to the first input shaft or the second input shaft, and the input/output gear is coupled to the output shaft as required. By doing so, four speed gears to be changed are realized on a high speed side, including a fifth speed gear where the first input shaft is coupled directly to the output shaft.

Consequently, it is possible to increase the number of gears to be changed without increasing the number of gears.

Advantageous Effect of Invention

According to the dual clutch transmission of the invention, it is possible to increase the number of gears to be changed while suppressing the increase in size, weight and cost thereof.

DESCRIPTION OF EMBODIMENTS

Hereinafter, an embodiment of the invention will be described in detail by reference to the drawings.

Figure 1:
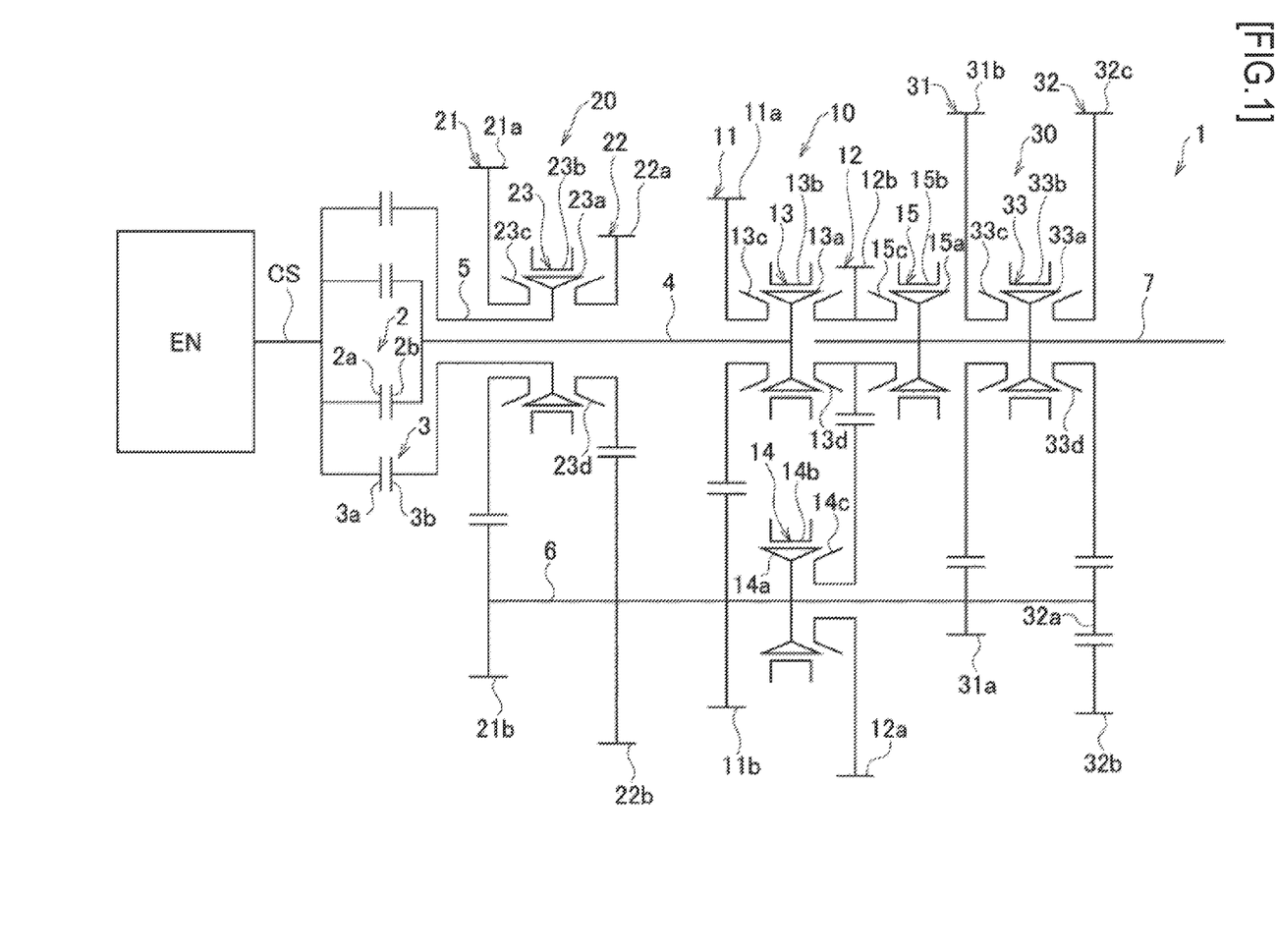
FIG. 1 is a schematic diagram showing a dual clutch transmission according to a first embodiment of the invention.

A dual clutch transmission 1 shown in FIG. 1 is configured to be mounted on a vehicle. Specifically, the dual clutch transmission 1 is controlled functionally by an ECU (whose illustration is omitted) and includes a first clutch 2, a second clutch 3, a first input shaft 4, a second input shaft 5, a counter shaft 6, an output shaft 7, a first splitter gear changing portion 10, a second splitter gear changing portion 20, and an output portion 30.

The first clutch 2 includes a first pressure plate 2a and a first clutch disc 2b. The first pressure plate 2a is fixed to a crankshaft CS of an engine (a power source) EN and rotates together with the crankshaft CS. The first clutch disc 2b is fixed to an input end side of the first input shaft 4 and rotates together with the first input shaft 4. The first clutch 2 transmits power of the engine EN to the first input shaft 4 when the first pressure plate 2a moves in the direction of the first clutch disc 2b to thereby be brought into press contact with the first clutch disc 2b.

The second clutch 3 is disposed concentrically with the first clutch 2. Specifically, the second clutch 3 includes a second pressure plate 3a and a second clutch disc 3b. The second pressure plate 3a is fixed to the crankshaft CS of the engine EN and rotates together with the crankshaft CS. The second clutch disc 3b is fixed to an input end side of the second input shaft 5 and rotates together with the second input shaft 5. The second clutch 3 transmits the power of the engine EN to the second input shaft 5 when the second pressure plate 3a moves in the direction of the second clutch disc 3b to thereby be brought into press contact with the second clutch disc 3b.

The first input shaft 4 is connected to the engine EN via the first clutch 2. This first input shaft 4 rotates as a result of the power of the engine EN being transmitted thereto.

The second input shaft 5 is a hollow shaft through which the first input shaft 4 is inserted rotatably and is connected to the engine EN via the second clutch 3. This second input shaft 5 rotates in the same direction as the direction in which the first input shaft 4 rotates as a result of the power of the engine EN being transmitted thereto.

The counter shaft 6 is disposed parallel to the first input shaft 4 and the second input shaft 5.

The output shaft 7 is disposed parallel to the counter shaft 6 and coaxial with the first input shaft 4 and the second input shaft 5.

The first splitter gear changing portion 10 includes a first high-speed gear train 11, a first low-speed gear train 12, a first coupling mechanism 13, a second coupling mechanism 14 and a third coupling mechanism 15.

The first high-speed gear train 11 includes a first input gear 11a and a first counter gear 11b. The first input gear 11a is provided so that the first input shaft 4 can be inserted therethrough rotatably and rotates about the first input shaft 4. The first counter gear 11b is fixed to the counter shaft 6 and meshes together with the first input gear 11a. This first counter gear 11b rotates about the counter shaft 6 together with the counter shaft 6 in an opposite direction to a direction in which the first input gear 11a rotates in association with the rotation of the first input gear 11a.

The first low-speed gear train 12 includes a second counter gear 12a and an input/output gear 12b. The second counter gear 12a is provided so that the counter shaft 6 can be inserted therethrough rotatably and rotates about the counter shaft 6. The input/output gear 12b is provided so that the output shaft 7 can be inserted therethrough rotatably and the input/output gear 12b meshes with the second counter gear 12a. This input/output gear 12b rotates about the output shaft 7 in an opposite direction to a direction in which the second counter gear 12a rotates in association with the rotation of the second counter gear 12a.

The first coupling mechanism 13 can couple the first input gear 11a and the input/output gear 12b selectively to the first input shaft 4. Specifically, the first coupling mechanism 13 includes a coupling hub 13a, a sleeve 13b, and dog gears 13c, 13d. The coupling hub 13a is fixed to an output end side of the first input shaft 4 and rotates together with the first input shaft 4. The sleeve 13b is provided so as not to rotate but to move axially relative to the coupling hub 13a. The dog gear 13c is fixed to the first input gear 11a and rotates together with the first input gear 11a. The dog gear 13d is fixed to the input/output gear 12b and rotates together with the input/output gear 12b.

The first coupling mechanism 13 couples the first input gear 11a to the first input shaft 4 when the sleeve 13b moves in the direction of the dog gear 13c to thereby be brought into engagement with the dog gear 13c. As this occurs, the first input gear 11a can rotate together with the first input shaft 4. On the other hand, when the sleeve 13b moves in the direction of the dog gear 13d to thereby be brought into engagement with the dog gear 13d, the first coupling mechanism 13 couples the input/output gear 12b to the first input shaft 4. As this occurs, the input/output shaft 12b can rotate together with the first input shaft 4.

The second coupling mechanism 14 can couple the second counter gear 12a to the counter shaft 6. Specifically, the second coupling mechanism 14 includes a coupling hub 14a, a sleeve 14b, and a dog gear 14c. The coupling hub 14a is fixed the counter shaft 6 and rotates together with the counter shaft 6. The sleeve 14b is provided so as not to rotate but to move axially relative to the coupling hub 14a. The dog gear 14c is fixed to the second counter gear 12a and rotates together with the second counter gear 12a.

The second coupling mechanism 14 couples the second counter gear 12a to the counter shaft 6 when the sleeve 14b moves in the direction of the dog gear 14c to thereby be brought into engagement with the dog gear 14c. As this occurs, the second counter gear 12a can rotate together with the counter shaft 6.

The third coupling mechanism 15 can couple the input/output gear 12b to the output shaft 7. Specifically, the third coupling mechanism 15 includes a coupling hub 15a, a sleeve 15b, and a dog gear 15c. The coupling hub 15a is fixed to an output shaft 7 and rotates together with the output shaft 7. The sleeve 15b is provided so as not to rotate but to move axially relative to the coupling hub 15a. The dog gear 15c is fixed to the input/output gear 12b and rotates together with the input/output gear 12b.

The third coupling mechanism 15 couples the input/output gear 12b to the output shaft 7 when the sleeve 15b moves in the direction of the dog gear 15c to thereby be brought into engagement with the dog gear 15c. As this occurs, the input/output shaft 12b can rotate together with the output shaft 7.

The second splitter gear changing portion 20 includes a second high-speed gear train 21, a second low-speed gear train 22 and a fourth coupling mechanism 23.

The second high-speed gear train 21 includes a second input gear 21a and a third counter gear 21b. The second input gear 21a is provided so that the second input shaft 5 can be inserted therethrough rotatably and rotates about the second input shaft 5. The third counter gear 21b is fixed to the counter shaft 6 and meshes with the second input gear 21a. This third counter gear 21b rotates about the counter shaft 6 together with the counter shaft 6 in an opposite direction to a direction in which the second input gear 21a rotates in association with the rotation of the second input gear 21a.

The second low-speed gear train 22 includes a third input gear train 22a and a fourth counter gear 22b. The third input gear 22a is provided so that the first input shaft 4 can be inserted rotatably and rotates about the first input shaft 4. The fourth counter gear 22b is fixed to the counter shaft 6 and meshes with the third input gear 22a. This fourth counter gear 22b rotates about the counter shaft 6 together with the counter shaft 6 in an opposite direction to a direction in which the third input gear 22a rotates in association with the rotation of the third input gear 22a.

The fourth coupling mechanism 23 can couple the second input gear 21a and the third input gear 22a selectively to the second input shaft 5. Specifically, the fourth coupling mechanism 23 includes a coupling hub 23a, a sleeve 23b, and dog gears 23c, 23d. The coupling hub 23a is fixed to an output end side of the second input shaft 5 and rotates together with the second input shaft 5. The sleeve 23b is provided so as not to rotate but to move axially relative to the coupling hub 23a. The dog gear 23c is fixed to the second input gear 21a and rotates together with the second input gear 21a. The dog gear 23d is fixed to the third input gear 22a and rotates together with the third input gear 22a.

The fourth coupling mechanism 23 couples the second input gear 21a to the second input shaft 5 when the sleeve 23b moves in the direction of the dog gear 23c to thereby be brought into engagement with the dog gear 23c. As this occurs, the second input gear 21a can rotate together with the second input shaft 5. On the other hand, the fourth coupling mechanism 23 couples the third input gear 22a to the second input shaft 5 when the sleeve 23b moves in the direction of the dog gear 23d to thereby be brought into engagement with the dog gear 23d. As this occurs, the third input gear 22a can rotate together with the second input shaft 5.

The output portion 30 includes a forward gear train 31, a reverse gear train 32 and a fifth coupling mechanism 33.

The forward gear train 31 includes a fifth counter gear 31a and a forward output gear 31b. The fifth counter gear 31a is fixed to the counter shaft 6. The fifth counter gear 31a rotates about the counter shaft 6 together with the counter shaft 6. The forward output gear 31b is provided so that the output shaft 7 is inserted therethrough rotatably and the forward output gear 31b meshes with the fifth counter gear 31a. This forward output gear 31b rotates about the output shaft 7 in an opposite direction to a direction in which the fifth counter gear 31a rotates in association with the rotation of the fifth counter gear 31a.

The reverse gear train 32 includes a sixth counter gear 32a, an idler gear 32b and a reverse output gear 32c. The sixth counter gear 32a is fixed to the counter shaft 6. The sixth counter gear 32a rotates about the counter shaft 6 together with the counter shaft 6. The idler gear 32b is provided so as not only to be attached to a shaft (whose illustration is omitted) parallel to the counter shaft 6 but also to mesh with the sixth counter gear 32a. This idler gear 32b rotates in an opposite direction to a direction in which the sixth counter gear 32a rotates in association with the rotation of the sixth counter gear 32a. The reverse output gear 32c is provided so that the output shaft 7 is inserted therethrough rotatably and the reverse output gear 32c meshes with the idler gear 32b. The reverse output gear 32c rotates about the output shaft 7 in an opposite direction to a direction in which the idler gear 32b rotates and in the same direction as a direction in which the sixth counter gear 32a rotates in association with the rotation of the idler gear 32b. A relationship among the sixth counter gear 32a, the idler gear 32b and the reverse output gear 32c in the drawings is drawn according to the related-art practice and differs from a relationship in reality.

The fifth coupling mechanism 33 can couple the forward output gear 31b and the reverse output gear 32c selectively to the output shaft 7. Specifically, the fifth coupling mechanism 33 includes a coupling hub 33a, a sleeve 33b, and dog gears 33c, 33d. The coupling hub 33a is fixed to an output shaft 7 and rotates together with the output shaft 7. The sleeve 33b is provided so as not to rotate but to move axially relative to the coupling hub 33a. The dog gear 33c is fixed to the forward output gear 31b and rotates together with the forward output gear 31b. The dog gear 33d is fixed to the reverse output gear 32c and rotates together with the reverse output gear 32c.

The fifth coupling mechanism 33 couples the forward output gear 31b to the output shaft 7 when the sleeve 33b moves in the direction of the dog gear 33c to thereby be brought into engagement with the dog gear 33c. As this occurs, the forward output gear 31b can rotate together with the output shaft 7. On the other hand, the fifth coupling mechanism 33 couples the reverse output gear 32c to the output shaft 7 when the sleeve 33b moves in the direction of the dog gear 33d to thereby be brought into engagement with the dog gear 33d. As this occurs, the reverse output gear 32c can rotate together with the output shaft 7.

Next, power transmission paths of the dual clutch transmission 1 will be described.

Figure 2:
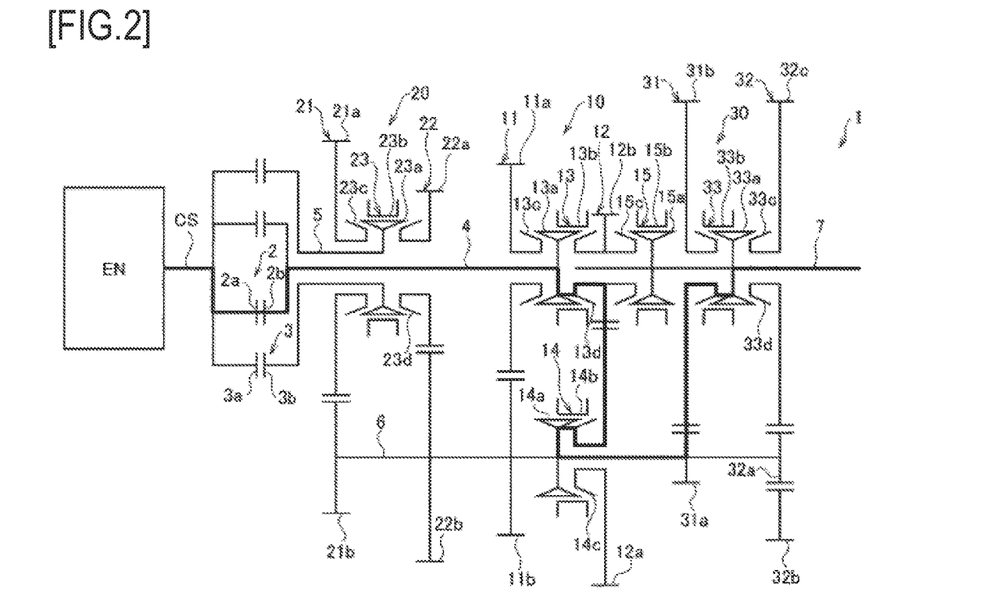
FIG. 2 is a diagram showing a power transmission path when a first gear is engaged in the dual clutch transmission shown in FIG. 1.

When a first gear is engaged as shown in FIG. 2, in the dual clutch transmission 1, the input/output gear 12b is coupled to the first input shaft 4 by the first coupling mechanism 13, the second counter gear 12a is coupled to the counter shaft 6 by the second coupling mechanism 14, the forward output gear 31b is coupled to the output shaft 7 by the fifth coupling mechanism 33, and the first clutch 2 is applied. By doing so, the power of the engine EN is transmitted sequentially from the first clutch 2 to the first input shaft 4, the first low-speed gear train 12, the counter shaft 6, the forward gear train 31 and the output shaft 7 in that order.

Figure 3:
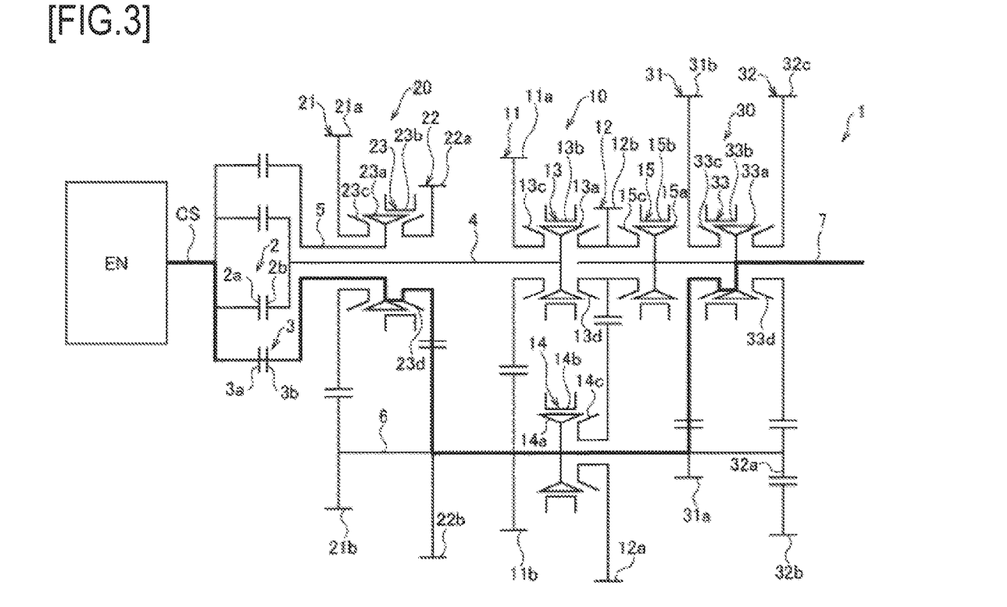
FIG. 3 is a diagram showing a power transmission path when a second gear is engaged in the dual clutch transmission shown in FIG. 1.

When a second gear is engaged as shown in FIG. 3, in the dual clutch transmission 1, the third input gear 22a is coupled to the second input shaft 5 by the fourth coupling mechanism 23, the forward output gear 31b is coupled to the output shaft 7 by the fifth coupling mechanism 33, and the second clutch 3 is applied. By doing so, the power of the engine EN is transmitted sequentially from the second clutch 3 to the second input shaft 5, the second low-speed gear train 22, the counter shaft 6, the forward gear train 31 and the output shaft 7 in that order.

Figure 4:
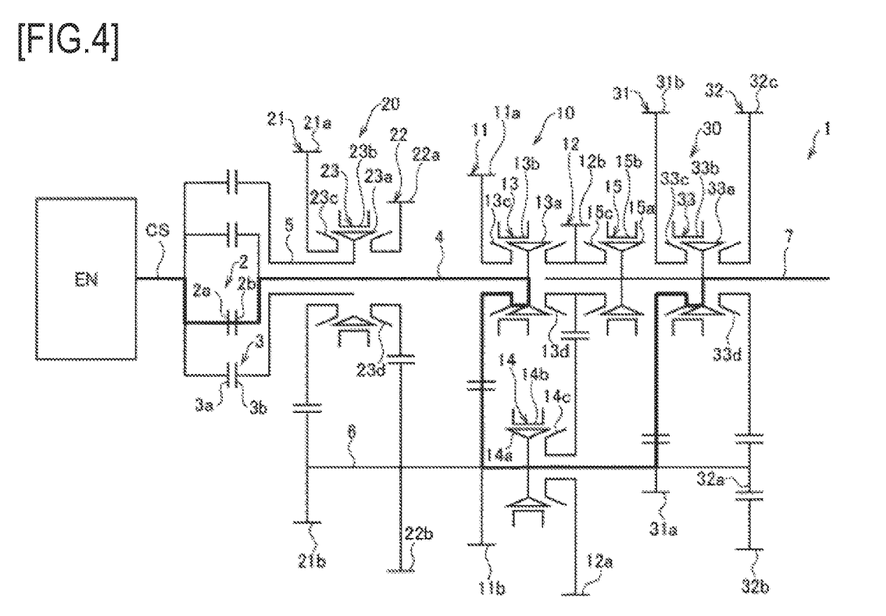
FIG. 4 is a diagram showing a power transmission path when a third gear is engaged in the dual clutch transmission shown in FIG. 1.

When a third gear is engaged as shown in FIG. 4, in the dual clutch transmission 1, the first input gear 11a is coupled to the first input shaft 4 by the first coupling mechanism 13, the forward output gear 31b is coupled to the output shaft 7 by the fifth coupling mechanism 33, and the first clutch 2 is applied. By doing so, the power of the engine EN is transmitted sequentially from the first clutch 2 to the first input shaft 4, the first high-speed gear train 11, the counter shaft 6, the forward gear train 31 and the output shaft 7 in that order.

Figure 5:
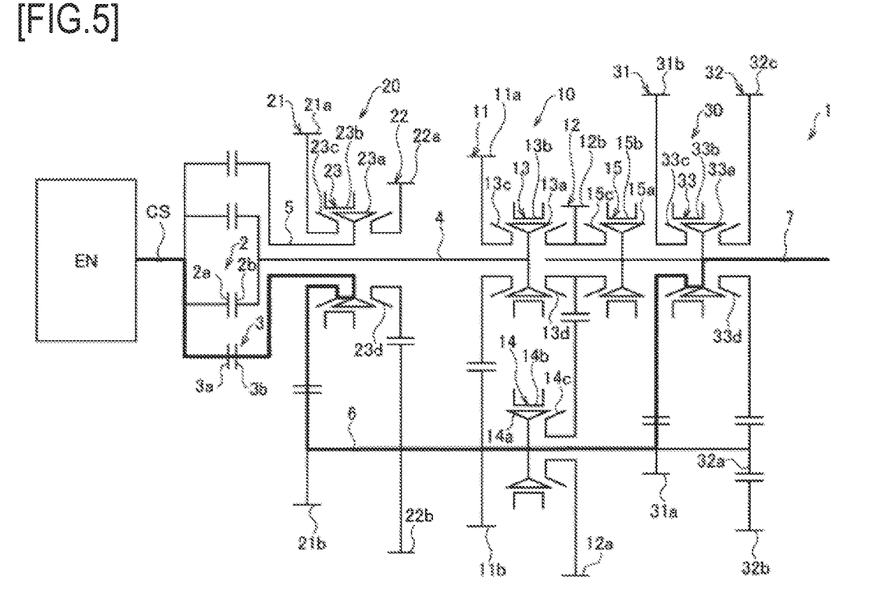
FIG. 5 is a diagram showing a power transmission path when a fourth gear is engaged in the dual clutch transmission shown in FIG. 1.

When a fourth gear is engaged as shown in FIG. 5, in the dual clutch transmission 1, the second input gear 21a is coupled to the second input shaft 5 by the fourth coupling mechanism 23, the forward output gear 31b is coupled to the output shaft 7 by the fifth coupling mechanism 33, and the second clutch 3 is applied. By doing so, the power of the engine EN is transmitted sequentially from the second clutch 3 to the second input shaft 5, the second high-speed gear train 21, the counter shaft 6, the forward gear train 31 and the output shaft 7 in that order.

Figure 6:
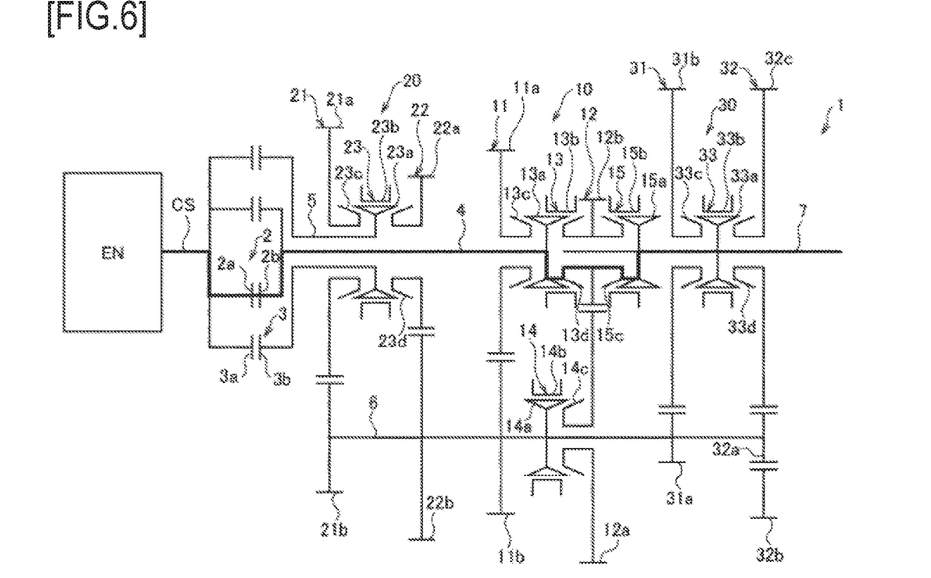
FIG. 6 is a diagram showing a power transmission path when a fifth gear is engaged in the dual clutch transmission shown in FIG. 1.

When a fifth gear is engaged as shown in FIG. 6, in the dual clutch transmission 1, the input/output gear 12b is coupled to the first input shaft 4 by the first coupling mechanism 13, the input/output gear 12b is coupled to the output shaft 7 by the third coupling mechanism 15, and the first clutch 2 is applied. By doing so, the power of the engine EN is transmitted sequentially from the first clutch 2 to the first input shaft 4, the input/output gear 12b and the output shaft 7 in that order.

Figure 7:
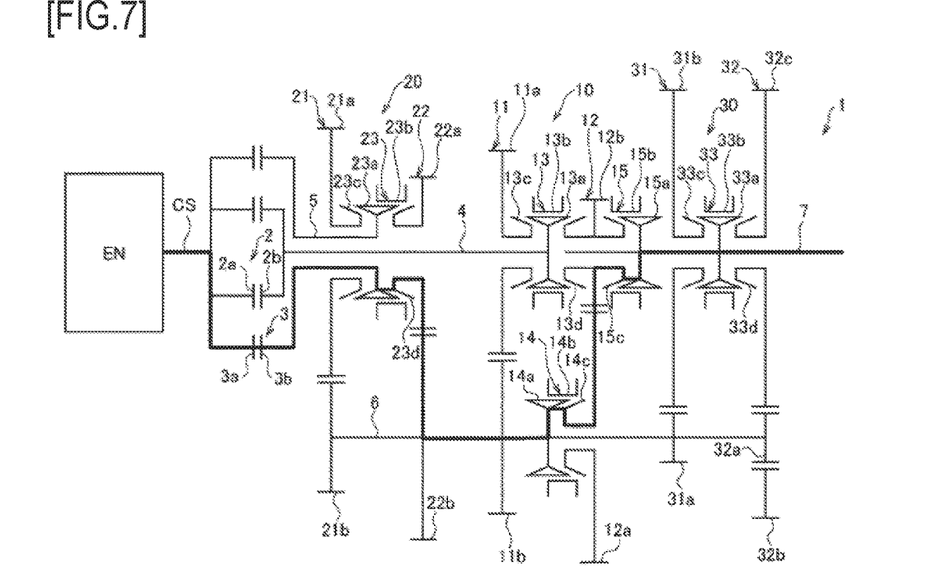
FIG. 7 is a diagram showing a power transmission path when a sixth gear is engaged in the dual clutch transmission shown in FIG. 1.

When a sixth gear is engaged as shown in FIG. 7, in the dual clutch transmission 1, the third input gear 22a is coupled to the second input shaft 5 by the fourth coupling mechanism 23, the second counter gear 12a is coupled to the counter shaft 6 by the second coupling mechanism 14, the input/output gear 12b is coupled to the output shaft 7 by the third coupling mechanism 15, and the second clutch 3 is applied. By doing so, the power of the engine EN is transmitted sequentially from the second clutch 3 to the second input shaft 5, the second low-speed rear train 22, the counter shaft 6, the first low-speed gear train 12, and the output shaft 7 in that order.

Figure 8:
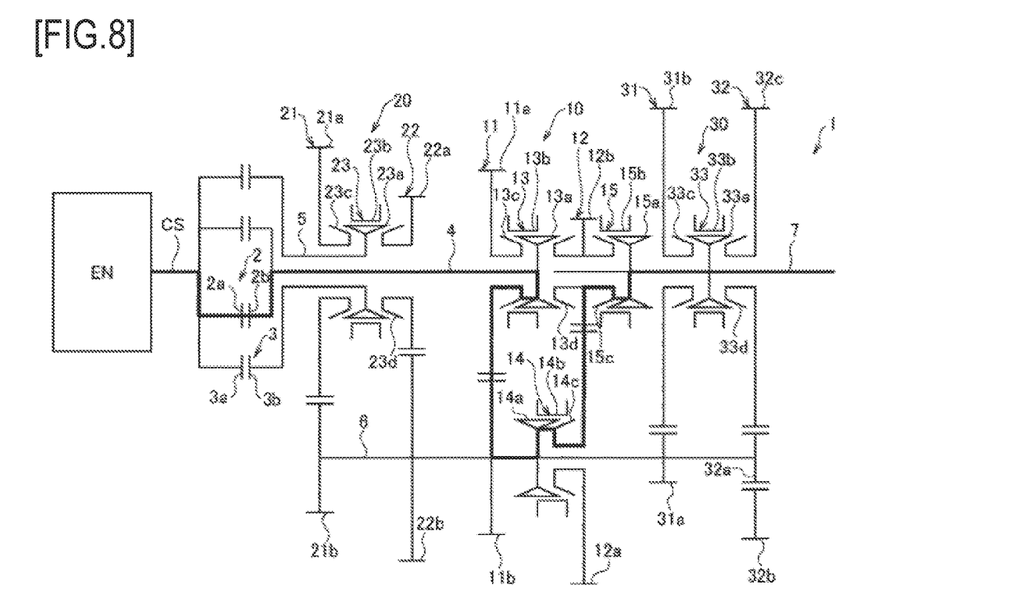
FIG. 8 is a diagram showing a power transmission path when a seventh gear is engaged in the dual clutch transmission shown in FIG. 1.

When a seventh gear is engaged as shown in FIG. 8, in the dual clutch transmission 1, the first input gear 11a is coupled to the first input shaft 4 by the first coupling mechanism 13, the second counter gear 12a is coupled to the counter shaft 6 by the second coupling mechanism 14, the input/output gear 12b is coupled to the output shaft 7 by the third coupling mechanism 15, and the first clutch 2 is applied. By doing so, the power of the engine EN is transmitted sequentially from the first clutch 2 to the first input shaft 4, the first high-speed gear train 11, the counter shaft 6, the first low-speed gear train 12, and the output shaft 7 in that order.

Figure 9:
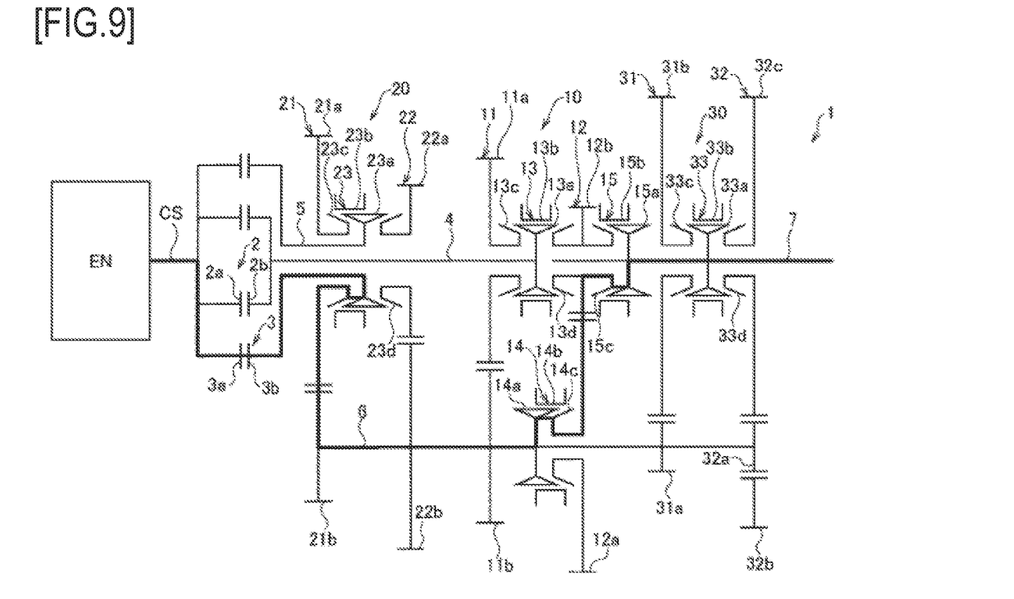
FIG. 9 is a diagram showing a power transmission path when an eighth gear is engaged in the dual clutch transmission shown in FIG. 1.

When an eighth gear is engaged as shown in FIG. 9, in the dual clutch transmission 1, the second input gear 21a is coupled to the second input shaft 5 by the fourth coupling mechanism 23, the second counter gear 12a is coupled to the counter shaft 6 by the second coupling mechanism 14, the output gear 12b is coupled to the output shaft 7 by the third coupling mechanism 15, and the second clutch 3 is applied. By doing so, the power of the engine EN is transmitted sequentially from the second clutch 3 to the second input shaft 5, the second high-speed gear train 21, the counter shaft 6, the first low-speed gear train 12, and the output shaft 7 in that order.

According to this embodiment, the first input gear, 11a, the input/output gear 12b, the second input gear 21a, and the third input gear 22a can be connected alternately to the first input shaft 4 or the second input shaft 5 in such a way as to replace the gear which is then connected to the first input shaft 4 or the second input shaft 5, and the forward output gear 31b can be coupled to the output shaft 7 as required. By doing so, four speed gears to be changed are realized on a low speed side.

In addition, the first input gear 11a, the second input gear 21a and the third input gear 22a are connected alternately to the first input shaft 4 or the second input shaft 5 in such a way as to replace the gear which is then connected to the first input shaft 4 or the second input shaft 5, and the input/output gear 12b is coupled to the output shaft 7 as required. By doing so, the four speed gears to be changed can be realized on the high-speed side, including the time when the fifth gear is engaged in which the first input shaft 4 is connected directly to the output shaft 7.

Consequently, it is possible to increase the number of gears to be changed without increasing the number of gears.

Figure 10:
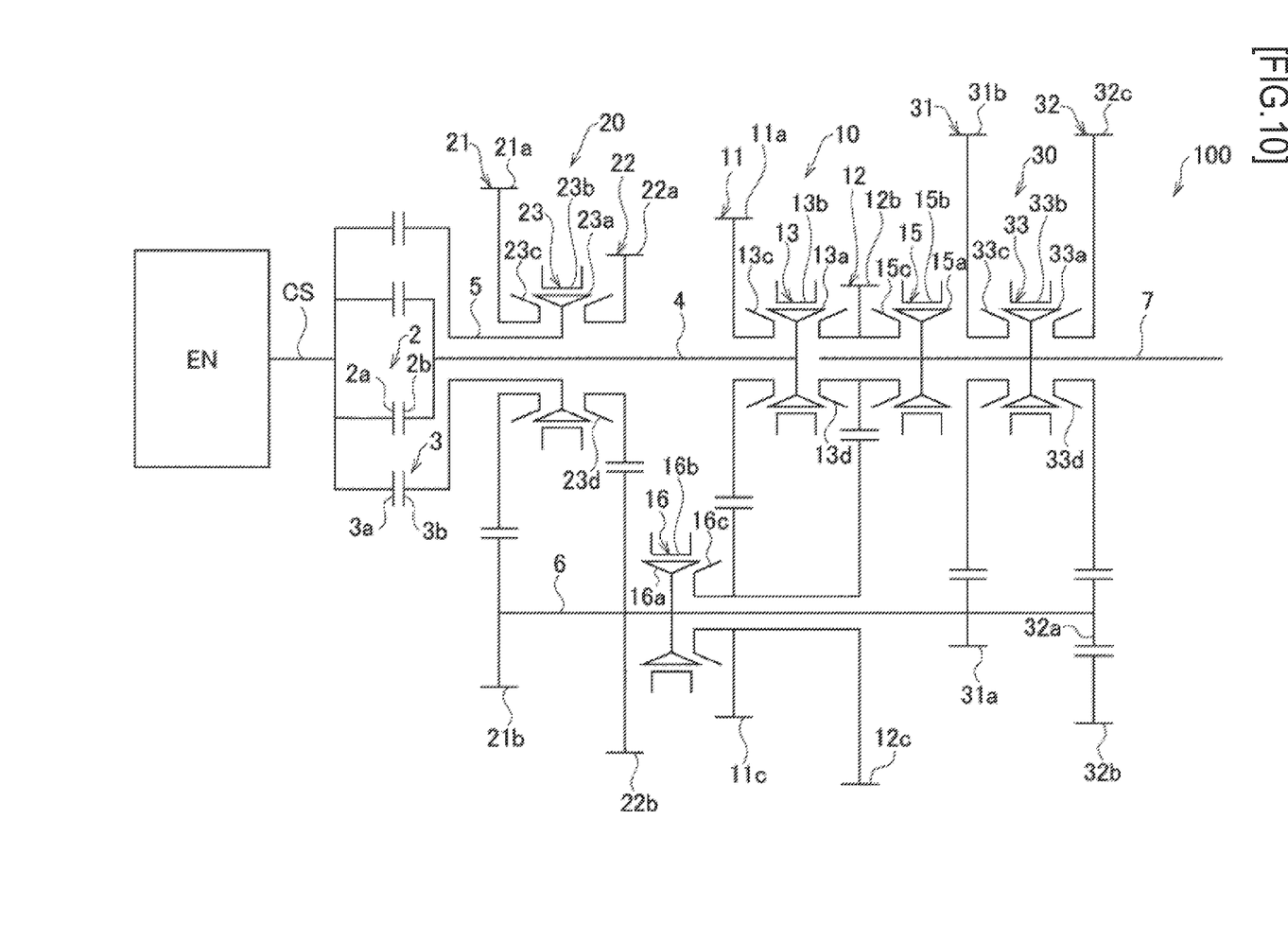
FIG. 10 is a schematic diagram showing a dual clutch transmission according to a comparison example.

Next, a comparison example will be described by reference to the drawings. A dual clutch transmission 100 according to the comparison example is such that the first counter gear and the second counter bear of the dual-transmission 1 of the first embodiment is integrated into one unit. Like reference numerals will be given to like configurations to those of the first embodiment, and the description thereof will be omitted below.

The dual clutch transmission 100 shown in FIG. 10 includes a first counter gear 11c and a second counter gear 12c, and a second coupling mechanism 16.

The first counter gear 11c and the second counter gear 12c are integrated into one unit. The first counter gear 11c is provided so that a counter shaft 6 is inserted therethrough rotatably and the first counter gear 11c meshes with a first input gear 11a. The second counter gear 12c is provided so that the counter shaft 6 is inserted therethrough rotatably and the second counter gear 12c meshes with an input/output gear 12b. The first counter gear 11c and the second counter gear 12c rotate about the counter shaft 6 in an opposite direction to a direction in which the first input gear 11a and the input/output gear 12b rotate in association with the rotation of the first input gear 11a and the input/output gear 12b.

The second coupling mechanism 16 can couple the first counter gear 11c and the second counter gear 12c which are integrated into one unit to the counter shaft 6. Specifically, the second coupling mechanism 16 includes a coupling hub 16a, a sleeve 16b, and a dog gear 16c. The coupling hub 16a is fixed the counter shaft 6 and rotates together with the counter shaft 6. The sleeve 16b is provided so as not to rotate but to move axially relative to the coupling hub 16a. The dog gear 16c is fixed to the first counter gear 11c and the second counter gear 12c which are integrated into one unit and rotates together with the first counter gear 11c and the second counter gear 12c.

The second coupling mechanism 16 couples the first counter gear 11c and the second counter gear 12c to the counter shaft 6 when the sleeve 16b moves in the direction of the dog gear 16c to thereby be brought into engagement with the dog gear 16c. As this occurs, the first counter gear 11c and the second counter gear 12c can rotate together with the counter shaft 6.

According to the comparison example, it is possible to increase the number of gears to be changed without increasing the number of gears. However, since the first counter gear 11c and the second counter gear 12c are integrated into one unit, there may be a situation in which a differential rotation is caused while transmitting the power of the engine EN. On the other hand, according to the embodiment, since the first counter gear 11b and the second counter gear 12a are formed independent of each other, there is no such situation in which a differential rotation is caused while transmitting the power of the engine EN.

Thus, while the embodiments to which the invention made by the inventor is applied have been described heretofore, the invention is not limited at all by the description and the drawings which make up part of the disclosure of the invention based on the embodiments. Namely, other embodiments, examples and operating techniques which are made based on the embodiments described herein by those skilled in the art to which the invention pertains should all, of course, be included in the scope of the invention.

REFERENCE SIGNS LIST 1 dual clutch transmission
2 first clutch
3 second clutch
4 first input shaft
5 second input shaft
6 counter shaft
7 output shaft
10 first splitter gear changing portion
11a first input gear
11b first counter gear
12a second counter gear
12b input/output gear
13 first coupling mechanism
14 second coupling mechanism
15 third coupling mechanism
20 second splitter gear changing portion
21a second input gear
21b third counter gear
22a third input gear
22b fourth counter gear
23 fourth coupling mechanism
30 output portion
31a fifth counter gear
31b forward output gear (output gear)
33 fifth coupling mechanism
EN engine (power source)

The invention claimed is:

1. A dual clutch transmission comprising:
a first clutch;
a second clutch that is disposed concentrically with the first clutch;
a first input shaft that is connected to a power source via the first clutch;
a second input shaft that is a hollow shaft through which the input shaft is inserted rotatably, the second input shaft being connected to the power source via the second clutch;
a counter shaft that is disposed parallel to the first input shaft and the second input shaft;
an output shaft that is disposed parallel to the counter shaft and coaxial with the first input shaft and the second input shaft;
a first splitter gear changing portion comprising:
  a first input gear through which the first input shaft is inserted rotatably;
  a first counter gear that is fixed to the counter shaft and meshes with the first input gear;
  a second counter gear through which the counter shaft is inserted rotatably;
  an input/output gear through which the output shaft is inserted rotatably, the input/output gear meshing with the second counter gear;
  a first coupling mechanism configured to couple the first input gear and the input/output gear selectively to the first input shaft;
  a second coupling mechanism configured to couple the second counter gear to the counter shaft; and
  a third coupling mechanism configured to couple the input/output gear to the output shaft;
a second splitter gear changing portion comprising:
  a second input gear through which the second input shaft is inserted rotatably;
  a third counter gear that is fixed to the counter shaft and meshes with the second input gear;
  a third input gear through which the first input shaft is inserted rotatably;
  a fourth counter gear that is fixed to the counter shaft and meshes with the third input gear; and
  a fourth coupling mechanism configured to couple the second input gear and the third input gear selectively to the second input shaft; and
an output portion comprising:
  a fifth counter gear that is fixed to the counter shaft;
  an output gear through which the output shaft is inserted rotatably, the output gear meshing with the fifth counter gear; and
  a fifth coupling mechanism configured to couple the output gear to the output shaft.

* * * * *